US012762668B2

(12) United States Patent
Lawoo et al.

(10) Patent No.: US 12,762,668 B2
(45) Date of Patent: Oct. 13, 2026

(54) DRIVING INFORMATION DISPLAY APPARATUS AND METHOD FOR CORRECTING CAMERA POSE VALUES USING VANISHING POINT

(71) Applicants: HYUNDAI MOTOR COMPANY, Seoul (KR); KIA CORPORATION, Seoul (KR); HYUNDAI AUTOEVER CORP, Seoul (KR)

(72) Inventors: Kim Lawoo, Hwaseong-si (KR); Lee Hyunseung, Seoul (KR)

(73) Assignees: Hyundai Motor Company, Seoul (KR); Kia Corporation, Seoul (KR); Hyundai Autoever Corp., Seoul (KR)

( * ) Notice: Subject to any disclaimer, the term of this patent is extended or adjusted under 35 U.S.C. 154(b) by 11 days.

(21) Appl. No.: 18/961,259

(22) Filed: Nov. 26, 2024

(65) Prior Publication Data

US 2025/0232415 A1 Jul. 17, 2025

(30) Foreign Application Priority Data

Jan. 17, 2024 (KR) ........................ 10-2024-0007439

(51) Int. Cl.

| | |
|---|---|
| ***G06T 5/70*** | (2024.01) |
| ***G01C 21/00*** | (2006.01) |
| ***G06T 7/70*** | (2017.01) |
| ***G07C 5/02*** | (2006.01) |

(52) U.S. Cl.

CPC ............ *G06T 5/70* (2024.01); *G01C 21/3867* (2020.08); *G06T 7/70* (2017.01); *G06T 2207/20132* (2013.01); *G06T 2207/30244* (2013.01); *G06T 2207/30256* (2013.01); *G07C 5/02* (2013.01)

(58) Field of Classification Search

CPC ... G06T 5/70; G06T 7/70; G06T 2207/20132; G06T 2207/30244; G06T 2207/30256; G06T 2207/30252; G06T 7/73; G06T 7/11; G06T 7/80; G01C 21/3867; G01C 21/3647; G01C 21/34; G01C 21/3602; G07C 5/02; B60K 35/28; B60K 35/29; B60K 2360/166; B60K 2360/176; B60K 2360/1868; B60R 1/24; B60R 2300/306; B60R 2300/402; G06V 20/588; B60Y 2400/92

See application file for complete search history.

(56) References Cited

FOREIGN PATENT DOCUMENTS

| | | | | |
|---|---|---|---|---|
| JP | 3876972 B2 * | 2/2007 | | |
| KR | 20130057699 A * | 6/2013 | ......... | G01C 21/3635 |
| KR | 10-1665599 B1 | 10/2016 | | |

* cited by examiner

*Primary Examiner* — Francis Geroleo
(74) *Attorney, Agent, or Firm* — Morgan Lewis & Bockius LLP

(57) ABSTRACT

A driving information display apparatus and method corrects camera pose values using a vanishing point. The apparatus includes a processor configured to receive driving guidance and vehicle location information, control the output of a guidance screen, and set a crop area in an image from a forward-view camera based on the calculated vanishing point. The storage unit stores road information, algorithms, and camera pose values, allowing the processor to generate a guidance screen by integrating the driving guidance information within the crop area centered on the vanishing point.

18 Claims, 11 Drawing Sheets

DRIVING INFORMATION DISPLAY APPARATUS AND METHOD FOR CORRECTING CAMERA POSE VALUES USING VANISHING POINT

CROSS-REFERENCE TO RELATED APPLICATION

The present application claims priority to Korean Patent Application No. 10-2024-0007439 filed on Jan. 17, 2024, the entire contents of which are incorporated herein for all purposes by this reference.

BACKGROUND OF THE PRESENT DISCLOSURE

Field of the Present Disclosure

The present disclosure relates to a driving information display apparatus and method for correcting camera pose values using a vanishing point, and more particularly, to an apparatus and method which, in the process of displaying driving information using augmented reality, extract a portion suitable providing information to a driver from an image captured by a forward-view camera, augment the extracted portion with driving information, and then provide the extracted portion augmented with the driving information.

Description of Related Art

With the development of location information and geographic information processing technology using the Global Positioning System (GPS) and similar technologies, various types of driving information are being provided during vehicle operation. In particular, as vehicle navigation systems and head-up displays (HUDs) advance, methods for representing driving information are also becoming more diverse.

Accordingly, there is a growing trend intended to provide driving information using augmented reality, such as the technology disclosed in Korean Patent No. 10-1665599 entitled "Augmented Reality Navigation Apparatus and Method for Route Guidance Service." When driving information is provided overlaid on a forward-view image captured by a vehicle's camera using augmented reality technology as in the prior art, it is necessary to extract an area capable of providing sufficient information to a driver from the forward-view image and then provide the information. The necessary portion extracted from the image in this manner is called a crop area. Therefore, there is a demand for a method that enables accurate extraction of the crop area.

The information included in this Background of the Present Disclosure is provided solely to enhance understanding of the general background of the present disclosure and should not be construed as an acknowledgment or suggestion that this information constitutes prior art already known to a person skilled in the art.

BRIEF SUMMARY

An object of the present disclosure is to accurately extract an area corresponding to an actual forward area in front of a vehicle from an image captured by the vehicle's forward-view camera.

An object of the present disclosure is to extract an area suitable for providing information to a driver from an image captured by the forward-view camera of a vehicle.

An object of the present disclosure is to correct camera pose values set in a vehicle.

An object of the present disclosure is to stably extract a crop area by preventing the extracted area from being unnecessarily altered due to temporary situations or errors while correcting camera pose values set in a vehicle.

The objects addressed by exemplary embodiments of the present disclosure are not limited to the objects described above, and other objects will be apparent by those skilled in the art from the following detailed description of the present disclosure.

According to various aspects of the present disclosure, a driving information display apparatus is provided, including: a processor configured to receive driving guidance information and vehicle location information and control the output of a guidance screen corresponding to the driving guidance information; and a storage unit configured to store road information and algorithms executed by the processor; wherein the storage unit is further configured to store the camera pose values of the forward-view camera of a vehicle; and wherein the processor is further configured to: set a crop area so that the location of a vanishing point calculated based on the camera pose values is the center of an image captured by the forward-view camera of the vehicle; and generate the guidance screen by adding the driving guidance information to the crop area.

The processor may be further configured to: determine whether the camera pose values can be corrected based on the driving route and driving speed information of the vehicle; and, when it is determined that the camera pose values can be corrected, correct the camera pose values using an image captured by the vehicle's forward-view camera, and store the corrected camera pose values in the storage unit.

The processor may be further configured to, to determine that the camera pose values can be corrected when there is no turn exceeding a predetermined reference angle in a forward section of a predetermined reference length on the driving route of the vehicle and the vehicle's speed is at or above a predetermined reference speed, determine that the camera pose values can be corrected.

The processor may be further configured to, when the vehicle's steering angle falls within a predetermined reference steering angle range is further satisfied, determine that the camera pose values can be corrected.

The processor may be further configured to, when the conditions for camera pose correction persist for a predetermined reference time or longer, correct the camera pose values using the image captured by the vehicle's forward-view camera and store the corrected camera pose values in the storage unit.

The processor may be further configured to: cumulatively store a plurality of corrected camera pose values in the storage unit; and update the camera pose values using those corrected values that have passed through a noise filter among the plurality of cumulatively stored corrected camera pose values.

The camera pose values may include a pitch value, a yaw value, and a roll value representing the angles of the camera; and the processor may be further configured to derive the corrected camera pose values by calculating a corrected pitch value, a corrected yaw value, and a corrected roll value using the image captured by the vehicle's forward-view camera.

The storage unit may also store the focal length value of the forward-view camera of the vehicle; and the processor may be further configured to: recognize left and right lanes beside the vehicle by analyzing the image captured by the forward-view camera; determine the location of the vanishing point in the image based on the intersection of the recognized left and right lanes; and calculate the corrected pitch value and the corrected yaw value based on the location of the vanishing point in the image and the focal length value.

The processor may be further configured to calculate the corrected pitch value using the value obtained by dividing the difference between the y-axis coordinate of the image's central point and the y-axis coordinate of the vanishing point in the image by the focal length's y-axis distance.

The processor may be further configured to calculate the corrected yaw value using the value obtained by dividing the difference between the x-axis coordinate of the image's central point and the x-axis coordinate of the vanishing point in the image by the focal length's x-axis distance The processor may be further configured to: recognize the horizon in the image captured by the vehicle's forward-view camera; and calculate the corrected roll value based on the angle of the recognized horizon in the image.

The methods and apparatuses of the present disclosure have additional features and advantages which will be apparent from or are described in greater detail in the accompanying drawings, which are incorporated herein, and the following Detailed Description, both of which are incorporated herein to explain certain principles of the present disclosure.

Figure 1:
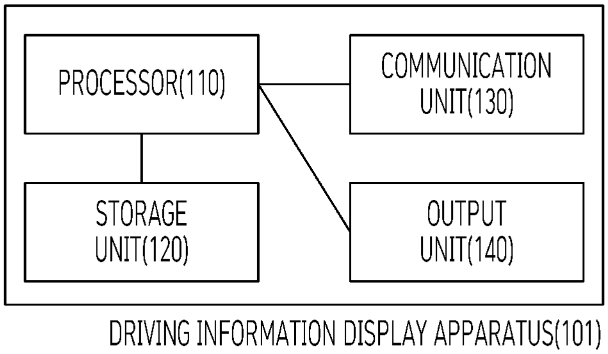
FIG. 1 is a block diagram illustrating the internal configuration of a driving information display device according to various exemplary embodiments of the present disclosure.

It should be understood that the appended drawings are not necessarily to scale, presenting a somewhat simplified representation of various features illustrative of the basic principles of the present disclosure. The specific design features of the present disclosure as included herein, including, specific dimensions, orientations, locations, and shapes will be determined in part by the particularly intended application and use environment.

In the figures, reference numbers refer to the same or equivalent parts of the present disclosure throughout the various figures of the drawing.

DETAILED DESCRIPTION

Reference will now be made in detail to various embodiments of the present disclosure, examples of which are illustrated in the accompanying drawings and described below. While the present disclosure will be described in conjunction with exemplary embodiments of the present disclosure, it is understood that the present description is not intended to limit the present disclosure to those exemplary embodiments of the present disclosure. On the other hand, the present disclosure is/are intended to cover not only the exemplary embodiments of the present disclosure, but also various alternatives, modifications, equivalents and other embodiments, which may be included within the spirit and scope of the present disclosure as defined by the appended claims.

Embodiments of the present disclosure will be described in detail below with reference to the accompanying drawings. In the following description of the present disclosure, if it is determined that a detailed description of any related known configuration or function may obscure the essence of the present disclosure, the detailed description will be omitted. Furthermore, in the following description of the exemplary embodiments of the present disclosure, specific numerical values are only examples, and the scope of the present disclosure is not limited thereby.

In describing the components of the exemplary embodiments, terms such as first, second, A, B, (a), (b), and so forth may be used. These terms are used merely to distinguish corresponding components from other components, and the natures, sequential positions, and/or orders of the corresponding components are not limited by the terms. Furthermore, unless defined otherwise, all the terms used herein, including technical or scientific terms, include the same meanings as commonly understood by those skilled in the art to which an exemplary embodiment of the present disclosure pertains. Terms such as those defined in commonly used dictionaries should be interpreted as having meanings consistent with the meanings in the context of related art, and should not be interpreted as having ideal or excessively formal meanings unless explicitly defined in the present application.

Embodiments of the present disclosure will now be described in detail with reference to FIGS. 1 to 11.

FIG. 1 is a block diagram illustrating the internal configuration of a driving information display apparatus 101 according to various exemplary embodiments of the present disclosure.

The driving information display apparatus 101 according to the exemplary embodiment may be provided inside a means of transportation such as a vehicle, or may be implemented in a detachable form. The driving information display apparatus 101 may generally include the form of a vehicle navigation system, an audio, video and navigation (AVN) system, a head-up display (HUD), or the like, and may be implemented in a form in which an application is provided on a mobile phone terminal such as a smartphone.

The driving information display apparatus 101 according to the exemplary embodiment may take the form of a server located outside a means of transportation, such as a vehicle. In the instant case, the driving information display apparatus 101 may be implemented to generate driving guidance information by processing determinations while being present outside a means of transportation and to output the driving guidance information to a display present inside the means of transportation. Furthermore, various embodiments may be implemented. The scope of rights of the present disclosure is not limited by the forms of such implementations.

Furthermore, the driving information display apparatus 101 of the exemplary embodiment may operate in conjunction with autonomous driving control systems such as an advanced driver assistance system (ADAS), a smart cruise control (SCC), a forward collision warning (FCW), and/or the like.

As shown in the drawing, the driving information display apparatus 101, according to the exemplary embodiment may include a processor 110, a storage unit 120, a communication unit 130, and an output unit 140.

The processor 110 is configured to control the storage unit 120, the communication unit 130, and the output unit 140 to execute applications, process data according to the algorithm defined in the application, communicate with an external module, and provide the results of the processing to a user.

The processor 110 may refer to a chip for processing general algorithms, such as a central processing unit (CPU) or an application processor (AP), or a set of such chips. The processor 110 may refer to a chip optimized for floating-point arithmetic, such as a general-purpose computing on graphics processing unit (GPGPU), designed to process artificial intelligence algorithms like deep learning, or a set of such chips. Alternatively, the processor 110 may refer to a module in which various types of chips execute algorithms and process data in a connected and distributed manner.

The processor 110 may be electrically connected to the storage unit 120 and the communication unit 130, may control these components, may be an electric circuit executing software commands, and may perform various types of data processing and determination to be described later. The processor 110 may be, for example, an electronic control unit (ECU), a micro-controller unit (MCU), or another lower level controller which is mounted on a means of transportation.

The storage unit 120 stores road information and algorithms executed by the processor. The road information may include map data, traffic conditions, or similar information. Depending on the configuration of the driving information display apparatus 101 of the present disclosure, the form or amount of road information stored inside the driving information display apparatus 101 may vary.

In some cases, the storage unit 120 may store road information including the map data and traffic condition information of all serviceable areas and provide services based on the road information. Alternatively, the storage unit 120 may temporarily store only road information relevant to the location currently being guided and provide services based on the temporarily stored road information.

The implementation may vary depending on the form in which the driving information display apparatus 101 according to an exemplary embodiment of the present disclosure is implemented inside or outside a means of transportation, the communication method used, the storage capacity of the storage unit 120, and/or input/output speed. This is a part which may be chosen autonomously by those skilled in the art depending on the implementation situation. The scope of rights of the present disclosure is not limited by such implementation variations The storage unit 120 may store graphics information be overlaid on an image captured of the area in front of a vehicle or a scene viewed through the front windshield of a vehicle by using augmented reality technology. The graphics information may include images to be output according to various types of guidance.

The storage unit 120 may have various forms, and may be at least one type of storage medium such as a flash memory-, hard disk-, micro-, card (e.g., secure digital (SD) card)-, extreme digital (XD) card-, random access memory (RAM)-, static RAM (SRAM)-, read-only memory (ROM)-, programmable ROM (PROM)-, electrically erasable PROM (EPROM)-, magnetic memory (MRAM)-, magnetic disk-, or optical disk-type storage medium, or the like. Depending on factors like data volume, processing speed, and storage duration, a different type of storage medium or a combination of storage media may be selected.

The algorithm stored in the storage unit 120 may be implemented as a computer program in an executable form, and stored in the storage unit 120 and then executed as needed. The algorithm stored in the storage unit 120 may be interpreted as including an instruction form which is temporarily loaded into volatile memory and instructs the processor to perform specific operations.

The communication unit 130 receives information for driving guidance from outside of the driving guidance information display apparatus 101 of the present disclosure over a wired/wireless communication network, and transmits necessary information to an external module.

The communication unit 130 may receive road information stored in the storage unit 120, algorithms executed by the processor 110, and the like from an external module, and may transmit information related to the current state of a means of transportation to the outside to obtain necessary information related to the transmitted information. For example, the communication unit 130 may continuously receive traffic information from a traffic information server to check real-time traffic information, and is configured to transmit the location and route information of a means of transportation, found through a module such as a Global Positioning System (GPS) receiver, to the outside to obtain the real-time traffic information of an area related to the location and route of the means of transportation.

The communication unit 130 is a hardware device implemented with various electronic circuits to transmit and receive signals over a wireless or wired connection. In an exemplary embodiment of the present disclosure, the communication unit 130 may perform communication within a means of transportation using infra-transportation means network communication technology, and may perform Vehicle-to-Infrastructure (V2I) communication with a server, infrastructure, another means of transportation, and/or the like outside a means of transportation using wireless Internet access or short-range communication technology. In the instant case, the communication within a means of transportation may be performed using Controller Area Network (CAN) communication, Local Interconnect Network (LIN) communication, FlexRay communication, and/or the like as the infra-transportation means network communication technology. Furthermore, such wireless communication technology may include wireless LAN (WLAN), Wireless Broadband (WiBro), Wi-Fi, Worldwide Interoperability for Microwave Access (WiMAX), etc. Moreover, the short-range communication technology may include Bluetooth, ZigBee, Ultra-wideband (UWB), Radio Frequency Identification (RFID), Infrared Data Association (IrDA), etc.

The output unit 140 may display augmented reality information, controlled by the processor 110, by executing algorithms stored in the storage unit 120. Augmented reality is a technology for enabling related information to be provided by adding graphics information to an image or scene of the real world.

The output unit 140 may be implemented as a head-up display (HUD), a cluster, an audio, video and navigation (AVN) system, a human-machine interface (HMI), and/or the like. Furthermore, the output unit 140 may include at least one of a liquid crystal display (LCD), a thin film transistor liquid crystal display (TFT LCD), a light emitting diode (LED) display, an organic light emitting diode (OLED) display, an active matrix OLED (AMOLED) display, a flexible display, a bended display, and a three-dimensional (3D) display. Some of these displays may be implemented as a transparent display configured in a transparent or translucent form to be able to view the outside thereof. Furthermore, the output unit 140 may be provided as a touch screen including a touch panel, and may be used as an input device as well as an output device.

When the output unit 140 is implemented as a general opaque display, the processor 110 may play back an image obtained by capturing an area in front of a means of transportation, such as a vehicle, on the output unit in real time, may determine a location where information will be displayed in the played-back image, and may add graphics information for the display of augmented reality information to this location, thereby providing related information to a user in a realistic manner.

In contrast, when the output unit 140 is implemented as a transparent display, the location where information will be displayed may be determined on the front screen of a means of transportation, such as a vehicle, visible through a transparent screen, graphics information for the representation of augmented reality information may be added to the location, and resulting information may then be output. The present disclosure is applicable to both of the types, and the processing type of the processor 110 may vary depending on the type of the output unit 140. Such design changes fall within the range which are apparent to those skilled in the art, and the scope of rights of the present disclosure is not limited by such differences in the type.

The driving information display apparatus 101 according to the present disclosure may have different embodiments depending on the processing method of the processor 110. Accordingly, the functions of the processor 110 will be described in conjunction with various exemplary embodiments under different scenarios.

In the present disclosure, the vehicle may encompass various means of transportation. In some cases, the vehicle may be interpreted as being based on a concept including not only various means of land transportation, such as cars, motorcycles, trucks, and buses, which drive on roads, but also various means of transportation, such as airplanes, drones, ships, etc.

As described above, the processor 110 performs control to receive driving guidance information and the vehicle's location data and output a guidance screen corresponding to the driving guidance information. In the instant case, the driving guidance information may include a variety of types of information. When a driver sets a destination and wants to receive guidance information related to it through a screen, the driving guidance information may include information related to the destination and a route leading to the destination. Various types of other information for the driving guidance of a vehicle may be included in the driving guidance information.

In particular, when the processor 110 provides guidance information by overlaying data on an image of an area in front of the vehicle using augmented reality technology, the driver may intuitively become aware of the guidance information. For example, how to drive on an actual road may be clearly conveyed by displaying the color of the lane in which the vehicle needs to drive or indicating the direction in which the vehicle needs to drive in an image of an area in front of the vehicle.

For the processor 110 to provide guidance information using augmented reality technology, it may be necessary to provide a forward-view image to ensure the driver easily understands the guidance. The image of the area in front of the vehicle is obtained using a forward-view camera mounted on the vehicle. The image of the area in front of the vehicle is generated by cutting out an area suitable for the provision of information to the driver from an image obtained by capturing a large area in front of the vehicle with the forward-view camera. The area cut out from the image from the forward-view camera to be provided to the driver in this manner is referred to as a crop area.

If the crop area is set too high in an image from the forward-view camera is selected as a crop area, a large sky area is shown and a forward road is not visible desirably within the crop area, making the forward road less visible, it is difficult for a driver to recognize it. In contrast, when an excessively lower portion of an image from the forward-view camera is selected as a crop area, only a large road area is shown in the area, making it challenging to display information related to an area far ahead and also it is difficult to provide information related to nearby geographical features or buildings.

Accordingly, the crop area should ideally be set so that the vanishing point is at its center. Since the forward-view camera is fixed to the vehicle, the location of the vanishing point may be calculated using camera pose values when the camera is installed in the vehicle. The camera pose values of the forward-view camera may be determined when the forward-view camera is mounted on the vehicle, and the determined values may be stored in the storage unit 120. Accordingly, based on the stored values, can be calculated the vanishing point in the image and set the crop area so that the center of the crop area is located at the vanishing point.

The camera pose values of the forward-view camera include a pitch value representative of the angle in the vertical direction centered on the lateral axis of the vehicle, a yaw value representative of the angle in the left-right direction centered on the vertical axis of the vehicle, and a roll value representative of the rotation angle around the longitudinal direction of the vehicle. When all the values are 0, the central point of the forward-view image aligns with the vanishing point.

In this manner, the camera pose values of the forward-view camera are determined when the camera is installed in the vehicle, and may be continuously used in the state of being stored in the storage unit 120. When the pose of the forward-view camera changes due to the weight of a load on the vehicle, the repair of the vehicle, a shock during a drive, or the like, it is difficult to accurately set the central location of the crop area as the vanishing point by using the camera pose values which are determined during installation.

Accordingly, when the camera pose values can be corrected using a forward-view image while the vehicle is driving, the processor 110 corrects the camera pose values and stores them in the storage unit 120. As a result, the camera pose values are corrected, ensures that the crop area is accurately set and driving guidance information can be provided to the driver using augmented reality technology.

As described above, the processor 110 sets a crop area such that the vanishing point, calculated from camera pose values in an image from the forward-view camera of a vehicle is the center of the crop area, and a guidance screen is generated by overlaying driving guidance information on the crop area. As described above, the camera pose values represent the different angles at which the actual camera is directed in the vertical, left-right, and rotational directions based on the pose in which the center of an image from the camera is a vanishing point.

Therefore, using the focal length and pitch value of the camera, it may be possible to calculate how far the actual vanishing point is located in the vertical direction from the central point of the image. Using the focal length and yaw value of the camera, it may be possible to calculate how far the actual vanishing point is located in the left-right direction from the central point of the image. Using the roll value of the camera, it may be possible indicates the rotational offset of the image to generate an image having a correct angle. A method of calculating the actual location of a vanishing point using pitch, yaw and roll values will be described in more detail with reference to FIGS. 8 to 10.

The processor 110 determines if the camera pose values can be corrected based on the driving route and driving speed information of the vehicle. When it is determined that the camera pose values can be corrected, the camera pose values are corrected using an image from the forward-view camera of the vehicle, and the corrected camera pose values are stored in the storage unit 120. A situation in which the camera pose values can be corrected is a situation in which information related to a vanishing point can be accurately obtained from a forward-view image.

If there is no turn exceeding a predetermined reference angle or more in a forward section of a predetermined reference length on the driving route of the vehicle and the speed of the vehicle is a predetermined reference speed or higher, the processor 110 determines that the camera pose values can be corrected. When the vehicle turns left and right, the location of the vanishing point continuously changes, so that the vanishing point remains constant only in a situation in which a vehicle is driving consistently in a straight section in the forward direction. Accordingly, the processor 110 checks the road situation ahead by referring to the storage unit 120, and, when a straight section continues, determines a vanishing point, and corrects camera pose values.

Accordingly, if the vehicle's steering angle remains within a predetermined reference steering angle range is further satisfied, the processor 110 may determine that the camera pose values can be corrected. When the steering angle does not change, indicates straight-line driving. Accordingly, it may be possible to determine whether the vanishing point can be reliably analyzed by considering not only the road situation ahead but also the actual driving direction of the vehicle.

If conditions for correcting the camera pose values persist for a predetermined reference time or longer, the processor 110 updates the pose values using the image from the forward-view camera of the vehicle, and stores the corrected camera pose values in the storage unit 120. This may prevent the problem in which camera pose values cannot be accurately corrected due to the temporary misrecognition of a vanishing point attributable to the condition of a vehicle or the like.

The processor 110 may cumulatively store a plurality of corrected camera pose values in the storage unit 120, and may update the camera pose values by using the corrected camera pose values having passed through a noise filter among the plurality of cumulatively stored corrected camera pose values. Correcting pose values based solely on a single vanishing point determination can result in inaccuracies if the vanishing point is temporarily mismeasured due to vehicle conditions. When a crop area is changed excessively frequently, it may cause inconvenience to a driver. Accordingly, when it is determined that the actual camera pose has changed by analyzing the accumulated correction results, the camera pose values are updated. Various technologies for removing outliers in data may be applied to the noise filter, and the noise filter is not limited a specific method. Updating the camera pose values using a plurality of accumulated corrected camera pose values may be performed using the average of recently generated corrected camera pose values. The average may also be obtained by assigning weights according to time so that a more weight is given to recently calculated corrected camera pose values.

The processor 110 derives corrected camera pose values by calculating a corrected pitch value, a corrected yaw value, and a corrected roll value using an image captured by the vehicle's forward-view camera. For this purpose, the storage unit 120 may store the focal length value of the forward-view camera of the vehicle. The focal length value of the forward-view camera is a value predetermined according to the type of camera, and may be stored in the storage unit 120 during the initial setting of the vehicle.

The processor 110 detects left and right lanes beside the vehicle by analyzing an image captured by the forward-view camera, determines the location of the vanishing point in the image based on the intersection of the recognized left and right lanes, and calculates the corrected pitch value and the corrected yaw value based on the location of the vanishing point in the image and the focal length value.

The vanishing point is the point in the image where objects appear to converge as they recede. As the number of straight lines which match the direction of the camera increases, the vanishing point may be recognized more accurately. In the case of an image of an area in front of a vehicle, a vanishing point may be obtained using the lane along which the vehicle is driving. In the instant case, the vanishing point may be accurately calculated only when the lane remains straight for the minimum distance ahead. As described above, the camera pose values may be corrected when the vehicle is driving on a road including a straight section over a predetermined distance.

When left and right lanes beside a vehicle are recognized, the linear function of a straight line represented by the left and right lanes in the image may be obtained. When linear functions representative of the two lanes, respectively, are obtained, the coordinates of the intersection point, and these coordinates become the coordinates of the vanishing point in the image.

As described above, the camera pose values have a pitch value, a yaw value, and a roll value. First, to correct the pitch value, the processor 110 calculates the corrected pitch value by dividing the difference between the y-axis coordinate of the central point of an image from the forward-view camera of the vehicle and the y-axis coordinate of the vanishing point in the image by the y-axis distance of the focal length.

Figure 8:
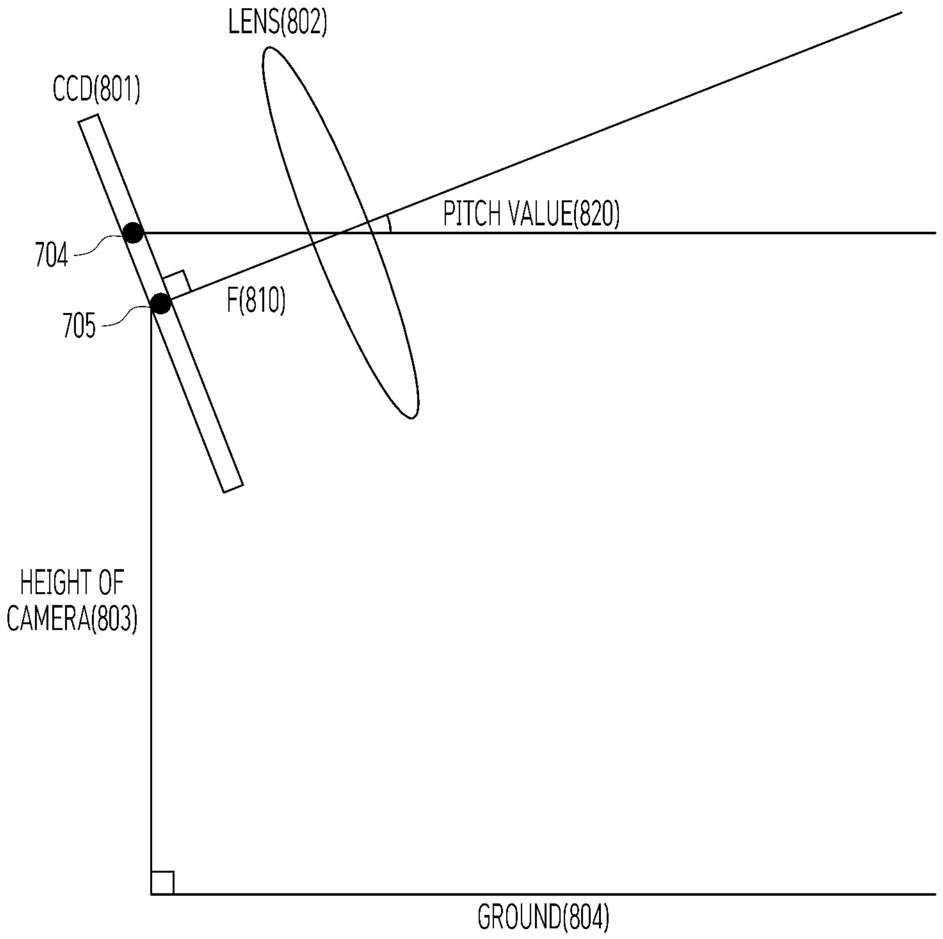
FIG. 8 is a diagram illustrating an example of correcting the pitch value of camera pose values in a driving information display apparatus according to various exemplary embodiments of the present disclosure.

As shown in FIG. 8, when the camera pose values are basically 0, a setting is made so that a vanishing point is located at the center of an image. Accordingly, in the drawing, the difference between the central point 705 of a charge-coupled device (CCD) 801, where the central point of the camera image is recognized, and the actual vanishing point 705 is generated by an angle corresponding to a pitch value 820.

When only the vertical direction is considered as shown in FIG. 8, the difference between the y coordinate of the central point of the image and the y coordinate of the vanishing point represents the distance on the y axis between points 704 and 705 in the drawing. In the instant case, in the drawing, F 810 is the distance away from the CCD by the focal length on a straight line drawn vertically from the central point 705 of the CCD, so that the value obtained by dividing the distance on the y-axis between the points 704 and 705 by F is tan (the pitch value 820). Accordingly, using the distance on the y axis between the points 704 and 705 and the focal length F of the camera, the pitch value may be calculated as an angle.

Furthermore, the processor 110 calculates the corrected yaw value by dividing the difference between the x-axis coordinate of the central point of an image from the forward-view camera of the vehicle and the x-axis coordinate of the vanishing point in the image by the x-axis distance of the focal length.

Figure 9:
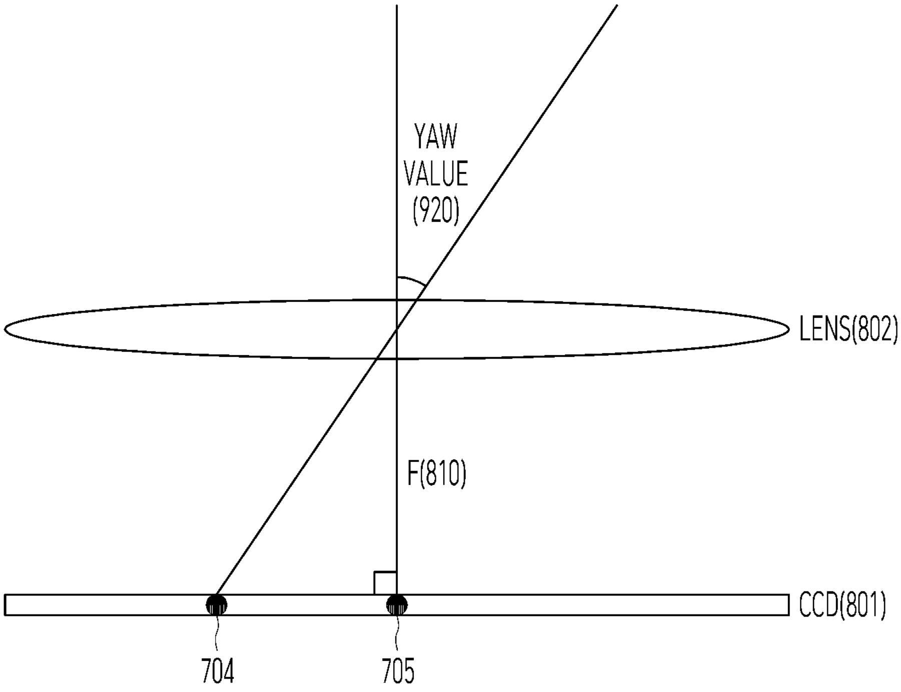
FIG. 9 is a diagram illustrating an example of correcting the yaw value of camera pose values in a driving information display apparatus according to various exemplary embodiments of the present disclosure.

As shown in FIG. 9, when the CCD 801 is viewed from above the vehicle, a yaw value represents a change in pose in the left-right directions. Accordingly, using the distance on the x axis between points 704 and 705 (the difference between the x coordinate of the central point and the x coordinate of the vanishing point) and the focal length F, the yaw value can be calculated as an angle, similar to the process for calculating the pitch value. In the instant case as well, the value obtained by dividing the distance on the x axis between the points 704 and 705 by F is tan (a yaw value 920). Accordingly, the yaw value may be calculated using the distance on the y axis between the points 704 and 705 and the focal length F of the camera.

The vanishing point of an image is influenced by the camera's vertical and horizontal angles, so that the location of the vanishing point can be accurately determined by correcting the pitch and yaw values. Meanwhile, the roll value constituting part of the camera pose values refers to how much the image is rotated compared to reality. When the actual pose of the camera is moved and an image is captured in a rotated state, it may cause inconvenience to a driver in terms of the use of the image. Accordingly, in the process of correcting the camera pose values, the roll value is also corrected.

The processor 110 detects the horizon in the image by analyzing a forward-view image from the vehicle's camera, and calculates the corrected roll value using the angle of the recognized horizon in the image.

When the roll value of the camera is 0, the horizon needs to be derived in parallel with the x-axis in the image. When an angle is formed with respect to the x axis, camera pose values are formed so that the roll value corresponds to the angle. Through this, when a crop area is extracted from a forward-view image, the processor 110 adjusts the image by rotating it in the opposite direction of the roll value so that the horizon is parallel to the x axis and then extract the crop area. Accordingly, this ensures that an accurate image may be provided even when the pose of the camera changes.

Figure 10:
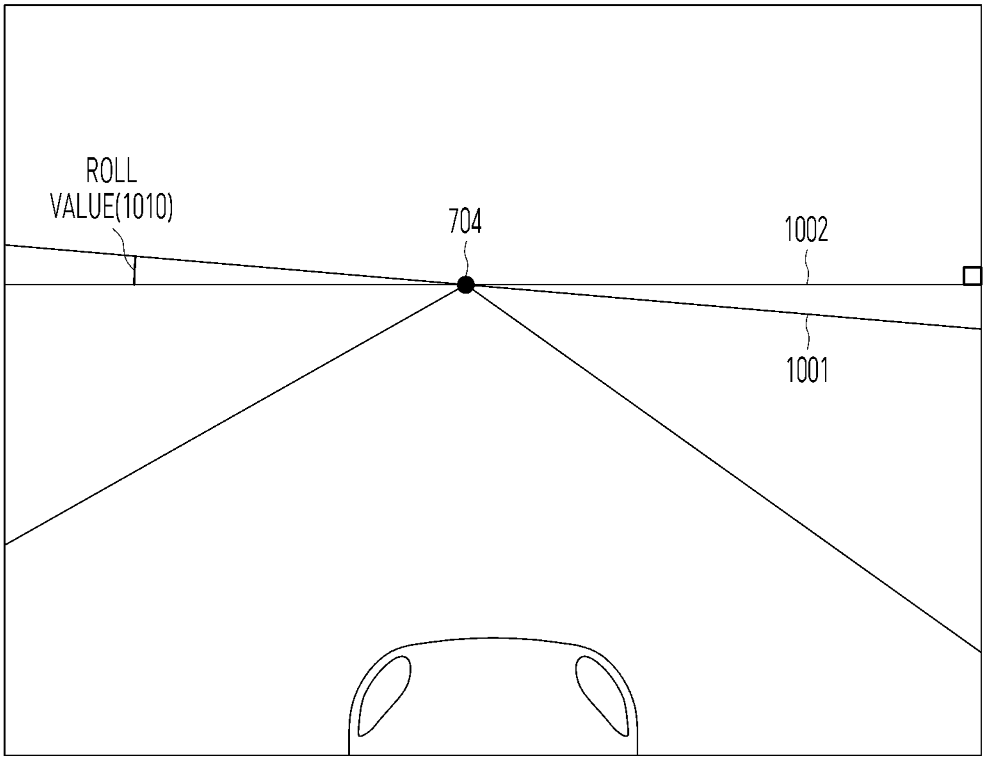
FIG. 10 is a diagram illustrating an example of correcting the roll value of camera pose values in a driving information display apparatus according to various exemplary embodiments of the present disclosure.

As shown in FIG. 10, when the horizon is detected in the forward-view image, the linear function of the straight line forming the horizon may be obtained and the roll value can be calculated using the slope of the linear function.

In this manner, the processor 110 may correct the pitch value, the yaw value, and the roll value using the forward-view image. When there are many buildings in a forward area, it may be difficult to recognize the horizon, in such cases, only the camera pose values in which the pitch and yaw values have been corrected may be derived. As described above, the location of the vanishing point may be obtained using the pitch and yaw values, and the roll value is used to correct the rotation of the image. Accordingly, it may be possible to accurately derive a crop area only by correcting the pitch and yaw values.

When the camera pose values are corrected and updated in the storage unit 120 as described above, the vanishing point may be accurately determined using the recently updated camera pose values even in a situation where it is difficult to recognize the vanishing point of the image, as in a curved section. A crop area may be set around the vanishing point, providing a more convenient view for the driver.

Figure 2:
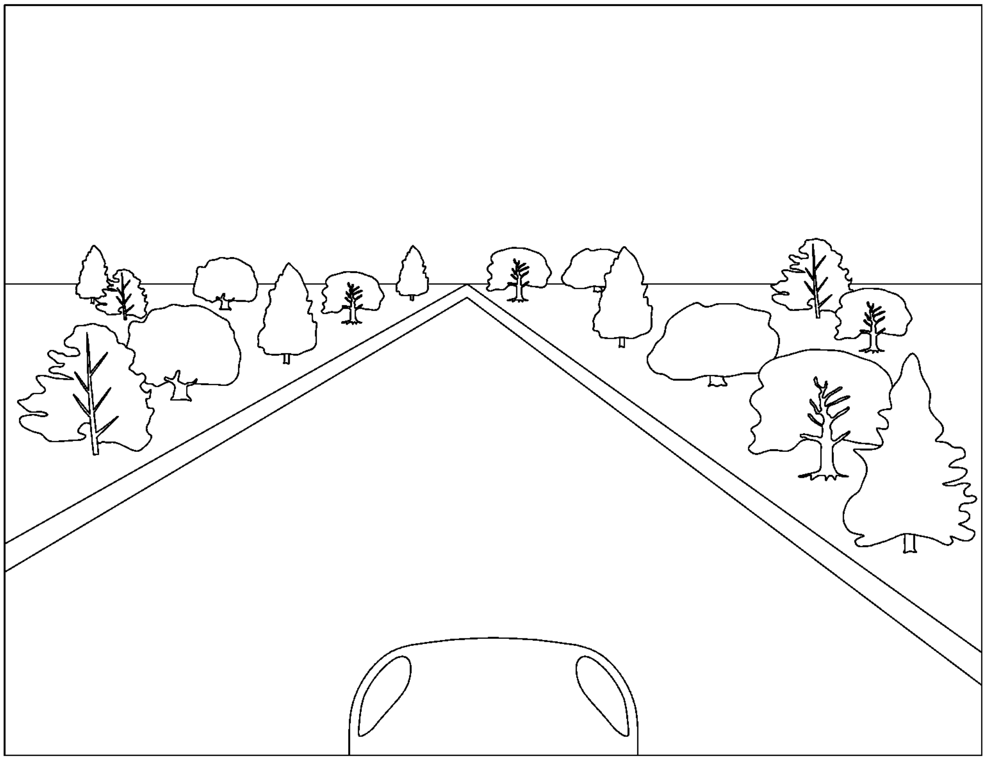
FIG. 2 is a diagram illustrating an example of an image captured by the forward-view camera of a vehicle in a driving information display apparatus according to various exemplary embodiments of the present disclosure.
Figure 3:
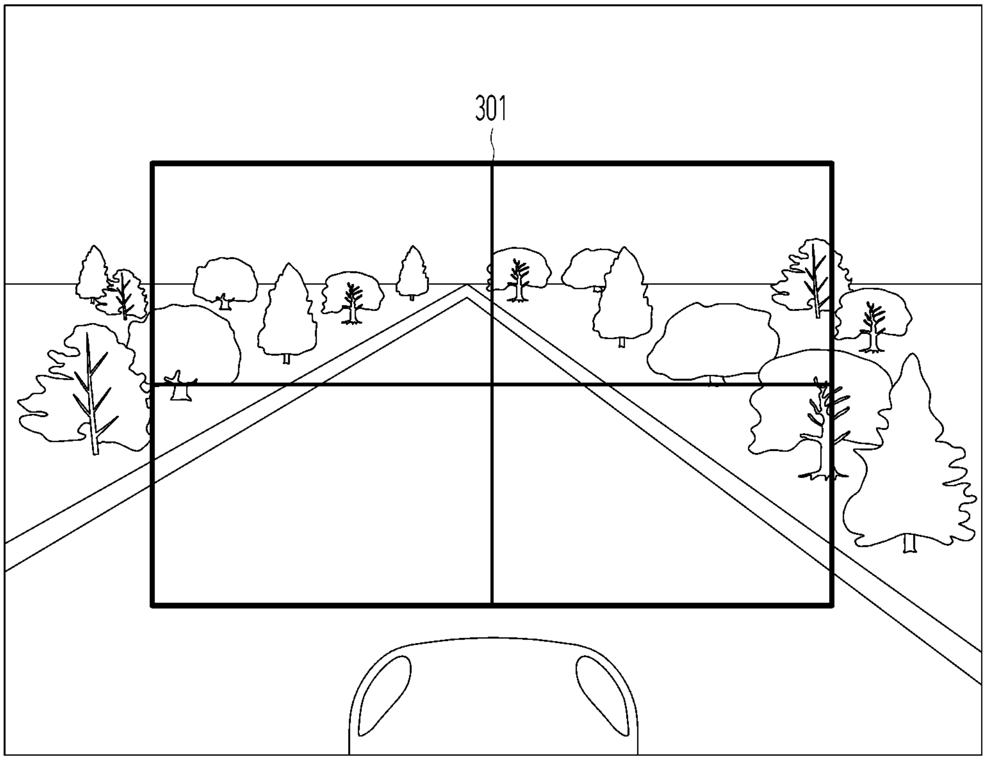
FIG. 3 is a diagram illustrating an example of setting a crop area using camera pose values configured for a vehicle in a driving information display apparatus according to various exemplary embodiments of the present disclosure.
Figure 4:
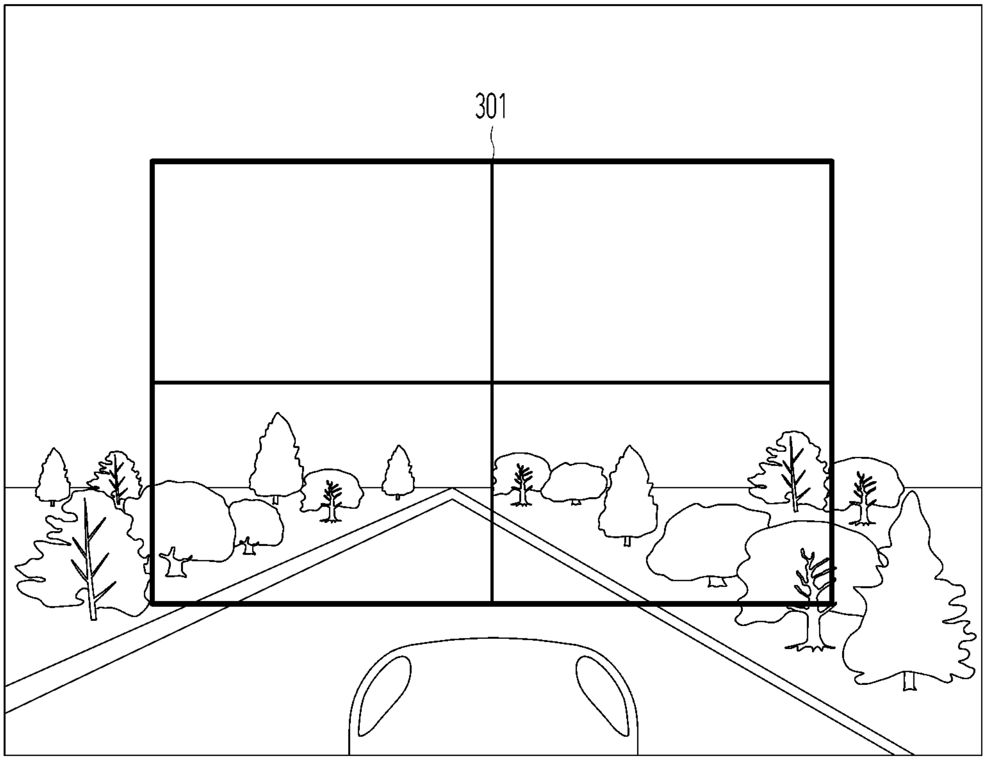
FIG. 4 is a diagram illustrating another example of setting a crop area using camera pose values set for a vehicle in a driving information display apparatus according to various exemplary embodiments of the present disclosure.

FIG. 2 is a diagram illustrates an example of an image captured by the forward-view camera in a driving information display apparatus according to various exemplary embodiments of the present disclosure, and FIGS. 3 and 4 are diagrams showing examples of setting a crop area using camera pose values set for a vehicle.

As shown in FIG. 2, an image captured by the forward-view camera of the vehicle is obtained and provided by capturing a wide front view. Accordingly, to display information within a designated display screen using augmented reality technology, an area suitable for displaying information must be cut out an area suitable for the display of information as a crop area.

FIG. 3 shows an example where a vanishing point is determined using camera pose values and a crop area 301 is set so that the center of the vanishing point is the center of the crop area 301. However, as a vehicle travels for a long time, the pose of a fixed camera may change depending on the collision or the loading state of the vehicle.

In the case of FIG. 3, the actual pose of the camera changes and the camera captures an image of a further downward area than that of stored camera pose values. In the instant case, there is a difference between the vanishing point calculated based on the camera pose values and the actual vanishing point. If the crop area 301 is set using the fixed pose values, only the road is shown, which may lead to a monotonous view for the driver In the case of FIG. 4, the actual pose of the camera has been changed to capture a higher area. Consequently, the crop area 301 contains only a lot of sky and a road is not shown appropriately. Accordingly, it may be difficult to display guidance information for driving on a road.

If the vanishing point in the image is clearly visible as shown in the drawing, the problem may be solved by checking the vanishing point every time the crop area is set and then setting the crop area based on the vanishing point. In most driving sections, it is often difficult to accurately recognize a vanishing point because a road is not straight or is obscured by another vehicle.

Additionally, significant changes in the camera's actual pose are rare. Continuously analyzing images and finding vanishing points during the driving process may be an unnecessary process which consumes a lot of resources.

Therefore, in the present disclosure, the system determines whether the vanishing point is clearly recognizable, as shown in the figure. When the vanishing point is identifiable, it is used to correct and update the camera pose values in the storage unit 120. Accordingly, even in a situation where it is difficult to recognize a vanishing point, a crop area is set using recently corrected values so that a vanishing point is exactly the center of the crop area.

Figure 5:
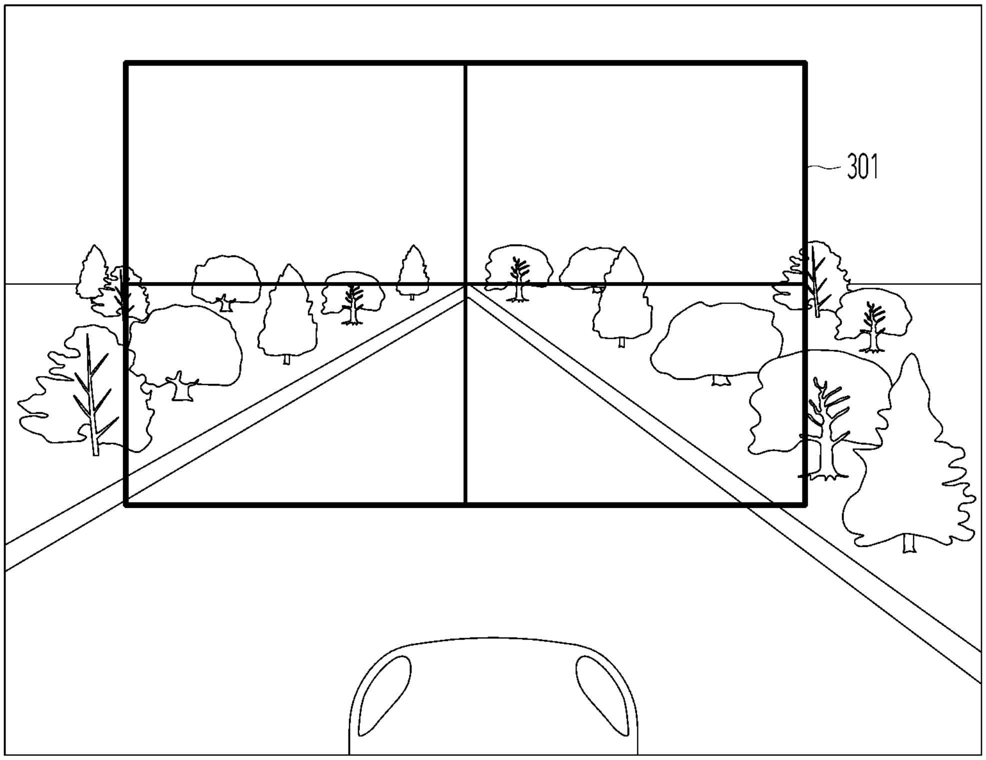
FIG. 5 is a diagram illustrating an example of correcting camera pose values based on a vanishing point and then setting a crop area in a driving information display apparatus according to various exemplary embodiments of the present disclosure.
Figure 6:
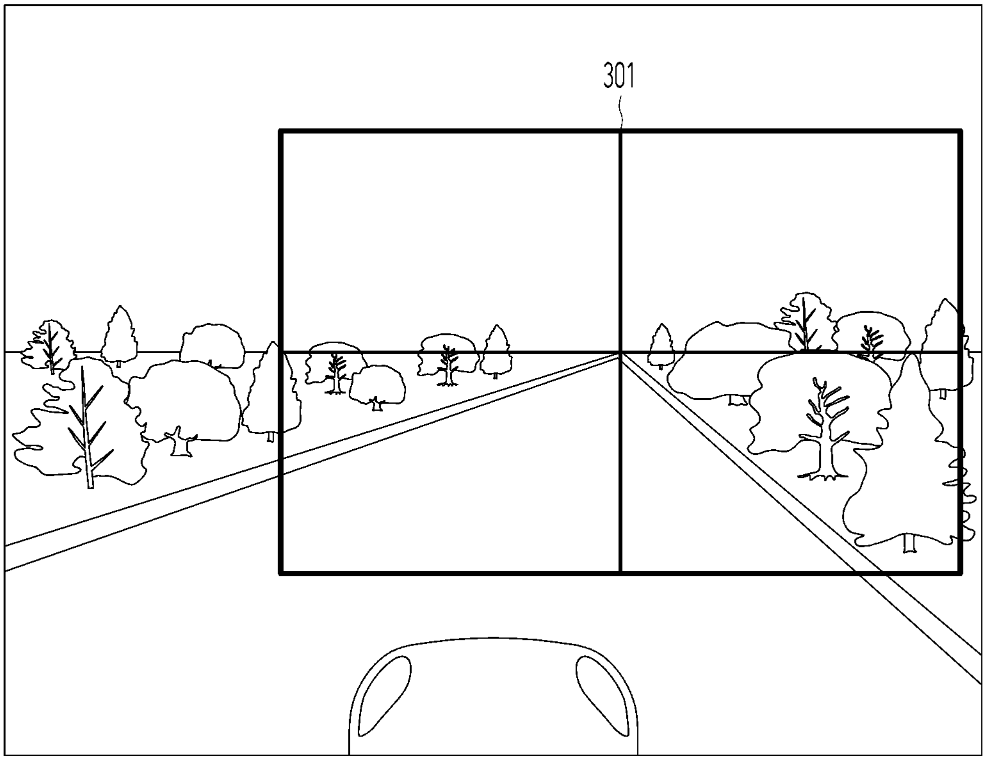
FIG. 6 is a diagram illustrating an example of correcting camera pose values based on a vanishing point and then setting a crop area in a driving information display apparatus according to various exemplary embodiments of the present disclosure.

FIGS. 5 and 6 illustrate examples of correcting camera pose values based on a vanishing point and then setting a crop area in a driving information display apparatus according to various exemplary embodiments of the present disclosure.

As shown in the figure, when camera pose values are continuously updated even when the pose of a camera changes during a driving process unlike in the case where a forward-view camera is set on an actual vehicle, the crop area 301 may be accurately set based on the location of the vanishing point.

FIG. 5 illustrates a scenario where the pose of a forward-view camera is changed in the upper and left direction compared to initial settings, and FIG. 6 shows a case where the pose of a forward-view camera is changed in the right direction compared to initial settings. Even in the case where the pose of the camera changes as described above, when camera pose values are continuously corrected as in the present disclosure, the center of the crop area 301 may be remain aligned with the vanishing point as shown in the drawing.

Figure 7:
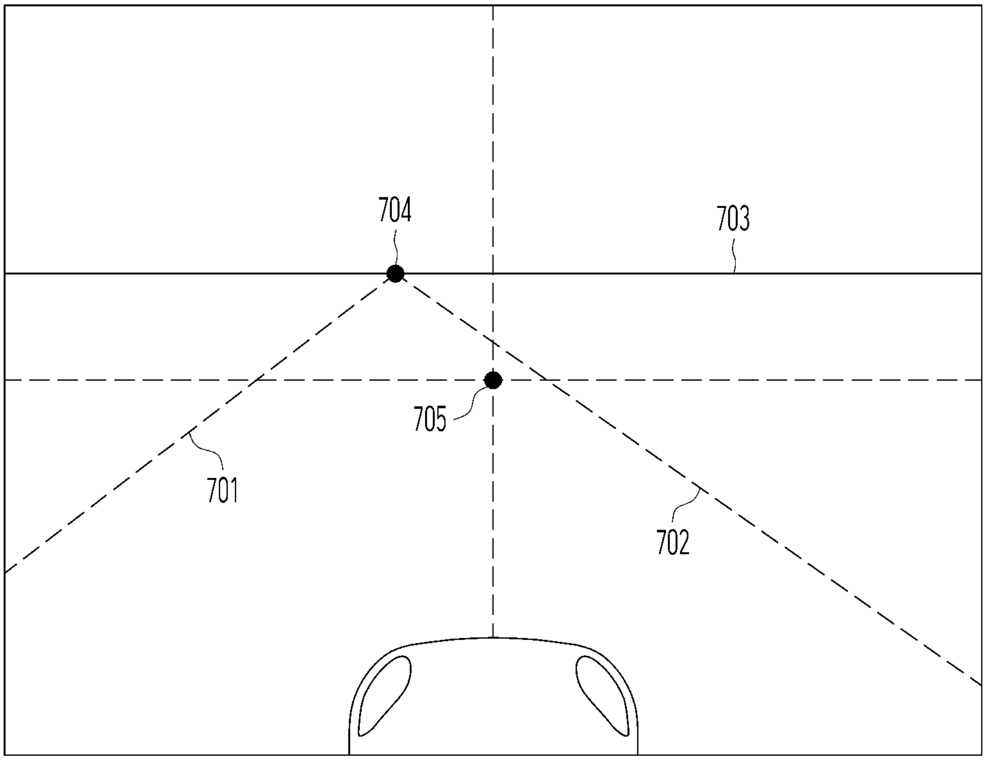
FIG. 7 is a diagram illustrating an example of deriving a vanishing point in a driving information display apparatus according to various exemplary embodiments of the present disclosure.

FIG. 7 is a diagram illustrating an example of deriving a vanishing point in a driving information display apparatus according to various exemplary embodiments of the present disclosure.

Reference numeral 701 indicates a left lane beside a vehicle, reference numeral 702 denotes a right lane beside the vehicle, reference numeral 703 denotes the horizon, reference numeral 704 denotes a vanishing point, and reference numeral 705 denotes the central point of an image.

In the driving information display apparatus of the present disclosure, the coordinates of a vanishing point are obtained using an image from a forward-view camera, and camera pose values are corrected using the coordinates of the vanishing point. Accordingly, it is important to obtain the coordinates of a vanishing point within an image.

As described above, in the present disclosure, a situation in which a vehicle drives in a straight line over a predetermined distance is set as a situation in which camera pose values can be corrected. In this manner, when a vehicle drives in a straight line, both left and right lanes 701 and 702 beside a vehicle are straight. Accordingly, when the left and right lanes 701 and 702 beside the vehicle are recognized, the point where the two lanes meet each other may be obtained as a vanishing point.

Various conventional methods can be used to recognize lane lines in images. When the left and right lanes 701 and 702 are recognized, linear functions representative of the respective lanes are derived on the coordinates of the image. A linear function may be easily derived by accurately recognizing only two points which form a straight line. Furthermore, once the two linear functions have been obtained, the intersection of the two linear functions may also be derived. Accordingly, the coordinates of the intersection of the two linear functions are recognized and used as the coordinates of a vanishing point.

Furthermore, in the case of the roll value of camera pose values, it is not corrected based on the vanishing point 704 but is corrected using the horizon 703. Since the roll value refers to the longitudinal rotation of a camera, an image is rotated and captured according to the roll value. Accordingly, it may be analyzed whether the horizon may be horizontal to the x axis, and the roll value may be corrected through the angle between the x axis and the horizon. In this case, the horizon can be detected, its linear equation derived, and the roll value corrected using the equation's slope.

FIG. 8 illustrates an example of correcting the pitch value of camera pose values in a driving information display apparatus according to various exemplary embodiments of the present disclosure.

FIG. 8 depicts a side view of a vehicle. Through the drawing, the vertical direction of the CCD 801 where an image from a camera is recognized, i.e., the y-axis direction of the image, may be determined.

In the drawing, the central point 705 of an image is the central point of the CCD 801, and light enters through the focal point of a lens 802. Accordingly, the vertical distance (the distance on the y axis of the image) between the vanishing point 704 and the central point 705 is determined by the pitch value 820. When the pitch value 820 is 0, the vanishing point 704 and the central point 705 are at the same location. However, since it is difficult to accurately install the camera to capture the actual vanishing point 704 as the central point 705, the location of the vanishing point may be calculated using the pitch value 720.

The processor 110 determines the pitch value 820 of the camera pose values stored in the storage unit 120, and also determines an F value 810, which is the focal length of the camera. The y-axis distance between the vanishing point 704 and the central point 705 in the figure is obtained by multiplying the focal length F 810 of the camera by tan (the pitch value 820). Through this, the y-coordinate value of the vanishing point 704 within the captured image may be derived.

Conversely, when the pitch value 820 is corrected using the vanishing point recognized in the actual image, the difference between the y-axis coordinate of the vanishing point 704 and the y-axis coordinate of the central point 705 is obtained, and yields tan (pitch value 820), thereby providing the corrected pitch value, obtained by dividing the difference by the focal length F 810, to be tan (the pitch value 820).

Through this, the pitch value 820 of the camera pose values may be corrected. Thereafter, even in a situation where it is difficult to recognize a vanishing point in an image, the location of the vanishing point may be accurately determined using the corrected pitch value 820 as described above.

FIG. 9 illustrates an example of correcting the yaw value of camera pose values in a driving information display apparatus according to various exemplary embodiments of the present disclosure.

The drawing shows a situation when viewed vertically from a location above a vehicle. The changes in the left and right directions of the CCD, i.e., the x-axis direction of a forward-view image, can be determined.

As described above, light enters through the focal point of the lens 802 located at the focal length F 810 F, so that the horizontal distance (the distance on the x axis of the image) between the vanishing point 704 and the central point 705 is determined according to the angle of the yaw value 920. When the yaw value 920 is 0, the vanishing point 704 and the central point 705 are at the same location. However, since it is difficult to accurately install the camera to capture the actual vanishing point 704 as the central point 705, the location of the vanishing point may be calculated using the yaw value 920.

The processor 110 determines the yaw value of camera pose values 920 stored in the storage unit 120, and also determine the F value 810, which is the focal length of the camera. Thereafter, the distance on the x axis between the vanishing point 704 and the central point 705 in the drawing is obtained by multiplying the focal length F 810 of the camera by tan (the yaw value 920). This yields the x-coordinate value of the vanishing point 704 within the captured image may be derived.

Conversely, when the yaw value 920 is corrected using the vanishing point recognized in the actual image, the difference between the x-axis coordinate of the vanishing point 704 and the x-axis coordinate of the central point 705 is obtained. Dividing this difference by the focal length F 810 yields tan (yaw value 920), providing the corrected yaw value.

Through this, the yaw value 920 of the camera pose values may be corrected. Even when the vanishing point is difficult to detect in an image, the location of the vanishing point may be accurately determined using the corrected yaw value 920 as described above.

FIG. 10 illustrates an example of correcting the roll value of camera pose values in a driving information display apparatus according to various exemplary embodiments of the present disclosure.

As shown in the drawing, the roll value 1010 indicates that a camera is rotated in the longitudinal direction of a vehicle. When the camera is rotated in the longitudinal direction of the vehicle, an image is rotated accordingly and captured, can be corrected by rotating the image in the opposite direction using a roll value 1010.

To correct the roll value 1010, the horizon 1001 passing through the vanishing point 704 is identified, and the roll value 1010 is derived through the angle between the horizon and the x axis 1002.

By rotating the image from the forward-view camera in the opposite direction using the roll value 1010 derived in this manner and then setting a crop area, it may be possible to provide a driver with the same guidance screen as when the camera is installed correctly.

Figure 11:
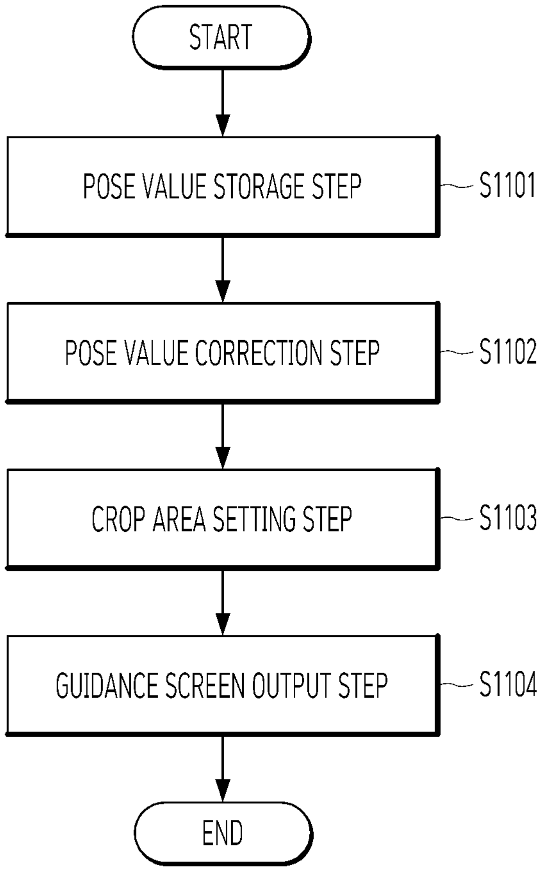
FIG. 11 is a flowchart illustrating the flow of a driving information display method according to various exemplary embodiments of the present disclosure.

FIG. 11 is a flowchart illustrating the flow of a driving information display method according to various exemplary embodiments of the present disclosure.

In the present exemplary embodiment, the driving information display method according to the present disclosure is a method which is performed by the driving information display apparatus 101 including the processor 110 and the storage unit 120 and a driving information management server 201. The components described above in conjunction with the operations of the driving information display apparatus 101 and the driving information management server 201 may be applied to the driving information display method with minimal modification. Accordingly, those skilled in the art may implement even the components, for which there are no specific descriptions in conjunction with the driving information display method below, by applying the foregoing descriptions of the driving information display apparatus 101 and the driving information management server 201.

In a pose value storage step S1101, the pose values of the forward-view camera of a vehicle are stored in the storage unit.

In a pose value correction step S1102, it is determined whether the camera pose values can be corrected based on the driving route and driving speed information of the vehicle. When it is determined that the camera pose values can be corrected, the camera pose values are updated using an image from the forward-view camera of the vehicle, and the corrected camera pose values are stored in the storage unit.

In the pose value correction step S1102, when there is no turn through a predetermined reference angle or more in a forward section of a predetermined reference length on the driving route of the vehicle and the speed is at or above a reference speed, it is determined that the camera pose values can be corrected.

In the pose value correction step S1102, when the condition that the steering angle of the vehicle is within a predetermined reference steering angle range is further satisfied, it is determined that the camera pose values can be corrected.

In the pose value correction step S1102, when a situation in which the camera pose values can be corrected continues for a predetermined reference time or longer, the camera pose values are updated using an image from the forward-view camera of the vehicle, and the corrected camera pose values are stored in the storage unit 120.

In the pose value correction step S1102, a plurality of corrected camera pose values are cumulatively stored in the storage unit, and the camera pose values are updated by using the corrected camera pose values having passed through a noise filter among the plurality of cumulatively stored corrected camera pose values.

In the instant case, the camera pose values include a pitch value, a yaw value, and a roll value indicative of the angles of the camera. In the pose value correction step S1102, corrected camera pose values are derived by calculating a corrected pitch value, a corrected yaw value, and a corrected roll value using the forward-view camera image.

The storage unit 120 further stores the focal length value of the forward-view camera of the vehicle. In the pose value correction step S1102, left and right lanes beside the vehicle are recognized by analyzing the image from the forward-view camera of the vehicle, the location of a vanishing point in the image is determined based on the intersection of the recognized left and right lanes, and the corrected pitch and yaw values are calculated based on the location of the vanishing point in the image and the focal length value.

In the pose value correction step S1102, the corrected pitch value is calculated by using the value obtained by dividing the difference between the y-axis coordinate of the central point of an image from the forward-view camera of the vehicle and the y-axis coordinate of the vanishing point in the image by the y-axis distance of the focal length.

In the pose value correction step S1102, the corrected yaw value is calculated by using the value obtained by dividing the difference between the x-axis coordinate of the central point of an image from the forward-view camera of the vehicle and the x-axis coordinate of the vanishing point in the image by the x-axis distance of the focal length.

In the pose value correction step S1102, the horizon in the image is recognized by analyzing the image from the forward-view camera of the vehicle, and the corrected roll value is calculated based on the detected horizon's angle in the image.

In a crop area setting step S1103, a crop area is set so that the location of a vanishing point calculated based on the camera pose values is the center of the image from the forward-view camera of the vehicle.

In a guidance screen output step S1104, a guidance screen is generated by adding driving guidance information to the crop area, and then output.

The present disclosure may achieve the advantage of accurately extracting an area corresponding to an actual forward area in front of a vehicle from an image from the forward-view camera of the vehicle.

The present disclosure may achieve the advantage of extracting an area suitable for the provision of information to a driver from an image captured by the vehicle's forward-view camera.

The present disclosure may achieve the advantage of correcting camera pose values set within a vehicle.

The present disclosure may achieve the advantage of stably extracting a crop area by preventing an area to be extracted from being unnecessarily changed due to a temporary situation or error while correcting camera pose values set in a vehicle.

Furthermore, various advantages which may be directly or indirectly understood by those skilled in the art may be provided throughout the present specification.

Although the present disclosure has been described with reference to the embodiments, those skilled in the art may variously modify and change the present disclosure without departing from the spirit and scope of the present disclosure described in the attached claims.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured as a plurality of control devices, or an integrated single control device.

In various exemplary embodiments of the present disclosure, the memory and processor may be provided as a single chip or as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented as hardware, software, or a combination of both.

Furthermore, the terms such as "unit," "module," etc. included in the specification refer to components that process at least one function or operation, which may be implemented by hardware, software, or a combination thereof.

In an exemplary embodiment of the present disclosure, the vehicle is used broadly to include various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For clarity and precise definition in the appended claims, the terms "upper," "lower," "inner," "outer," "up," "down," "upwards," "downwards," "front," "rear," "back," "inside," "outside," "inwardly," "outwardly," "interior," "exterior," "internal," "external," "forwards," and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes "A," "B," and "A and B."

In the present specification, unless stated otherwise, singular terms include their plural forms unless the context clearly indicates otherwise.

In exemplary embodiments of the present disclosure, "at least one of A and B" may refer to "at least one of A or B" or "at least one of combinations of at least one of A and B." Furthermore, "one or more of A and B" may refer to "one or more of A or B" or "one or more of combinations of one or more of A and B."

In the exemplary embodiment of the present disclosure, it should be understood that a term such as "include" or "have" indicate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not exhaustive or intended to limit the disclosure to the exact forms presented, as numerous modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving information display apparatus comprising:

a processor configured to receive driving guidance information and vehicle location information and perform control to output a guidance screen corresponding to the driving guidance information; and a storage unit including at least one memory configured to store road information and algorithms executed by the processor;

wherein the storage unit is further configured to store camera pose values of a forward-view camera of a vehicle; and wherein the processor is further configured to:

determine whether the camera pose values can be corrected based on a driving route and driving speed information of the vehicle, in response to determining that the camera pose values can be corrected, correct the camera pose values using an image captured from the forward-view camera of the vehicle, and store the corrected camera pose values in the storage unit, set, in the image from the forward-view camera of the vehicle, a crop area so that a location of a vanishing point calculated based on the camera pose values is a center of the crop area, and generate the guidance screen by adding the driving guidance information to the crop area.

2. The driving information display apparatus of claim 1, wherein the processor is further configured to:

when there is no turn through a predetermined reference angle or more in a forward section of a predetermined reference length on the driving route of the vehicle and the speed of the vehicle is a predetermined reference speed or higher, determine that the camera pose values can be corrected.

3. The driving information display apparatus of claim 2, wherein the processor is further configured to:

when a condition that a steering angle of the vehicle is within a predetermined reference steering angle range is further satisfied, determine that the camera pose values can be corrected.

4. The driving information display apparatus of claim 3, wherein the processor is further configured to:

when a situation in which the camera pose values can be corrected continues for a predetermined reference time or longer, correct the camera pose values using the image from the forward-view camera of the vehicle, and store the corrected camera pose values in the storage unit.

5. The driving information display apparatus of claim 1, wherein the processor is further configured to:

cumulatively store a plurality of corrected camera pose values in the storage unit; and update the camera pose values by using the corrected camera pose values having passed through a noise filter among the plurality of cumulatively stored corrected camera pose values.

6. The driving information display apparatus of claim 1, wherein the camera pose values include a pitch value, a yaw value, and a roll value representing angles of the camera; and wherein the processor is further configured to derive the corrected camera pose values by calculating a corrected pitch value, a corrected yaw value, and a corrected roll value using the image from the forward-view camera of the vehicle.

7. The driving information display apparatus of claim 6, wherein the storage unit is configured to further store a focal length value of the forward-view camera of the vehicle; and wherein the processor is further configured to:

detect left and right lanes beside the vehicle by analyzing the image from the forward-view camera of the vehicle;

determine the location of the vanishing point in the image based on an intersection of the detected left and right lanes; and calculate the corrected pitch value and the corrected yaw value based on the location of the vanishing point in the image and the focal length value.

8. The driving information display apparatus of claim 7, wherein the processor is further configured to calculate the corrected pitch value by using a value obtained by dividing a difference between a y-axis coordinate of a central point of the image from the forward-view camera of the vehicle and a y-axis coordinate of the vanishing point in the image by a y-axis distance of the focal length.

9. The driving information display apparatus of claim 7, wherein the processor is further configured to calculate the corrected yaw value by using a value obtained by dividing a difference between an x-axis coordinate of a central point of the image from the forward-view camera of the vehicle and an x-axis coordinate of the vanishing point in the image by an x-axis distance of the focal length.

10. The driving information display apparatus of claim 6, wherein the processor is further configured to:

recognize a horizon in the image by analyzing the image from the forward-view camera of the vehicle; and calculate the corrected roll value using an angle of the recognized horizon in the image.

11. A driving information display method, the driving information display method being performed by a driving information management server equipped with a processor and a storage unit including at least one memory, the driving information display method comprising:

a pose value storage step of storing camera pose values of a forward-view camera of a vehicle in the storage unit, using the processor;

a pose value correction step of determining whether the camera pose values can be corrected based on a driving route and driving speed information of the vehicle using the processor, and in response to determining that the camera pose values can be corrected, correcting the camera pose values by the processor, using an image from the forward-view camera of the vehicle, and storing the corrected camera pose values in the storage unit;

a crop area setting step of setting, in the image from the forward-view camera of the vehicle, a crop area so that a location of a vanishing point calculated by the processor based on the camera pose values is a center of the crop area; and a guidance screen output step of generating a guidance screen, using the processor, by adding driving guidance information to the crop area, and outputting the guidance screen.

12. The driving information display method of claim 11, wherein the pose value correction step comprises:

when there is no turn through a predetermined reference angle or more in a forward section of a predetermined reference length on the driving route of the vehicle and the speed of the vehicle is a predetermined reference speed or higher, determining that the camera pose values can be corrected using the processor.

13. The driving information display method of claim 12, wherein the pose value correction step comprises:

when a condition that a steering angle of the vehicle is within a predetermined reference steering angle range is further satisfied, determining that the camera pose values can be corrected using the processor.

14. The driving information display method of claim 13, wherein the pose value correction step comprises:

when a situation in which the camera pose values can be corrected continues for a predetermined reference time or longer, correcting the camera pose values using the image from the forward-view camera of the vehicle, and storing the corrected camera pose values in the storage unit using the processor.

15. The driving information display method of claim 11, wherein the pose value correction step comprises:

cumulatively storing a plurality of corrected camera pose values in the storage unit using the processor; and updating the camera pose values by using corrected camera pose values having passed through a noise filter among the plurality of cumulatively stored corrected camera pose values using the processor.

16. The driving information display method of claim 11, wherein the camera pose values include a pitch value, a yaw value, and a roll value representing angles of the camera; and wherein the pose value correction step comprises deriving the corrected camera pose values, using the processor, by calculating a corrected pitch value, a corrected yaw value, and a corrected roll value using the image from the forward-view camera of the vehicle.

17. The driving information display method of claim 16, wherein the storage unit is configured to further store a focal length value of the forward-view camera of the vehicle; and wherein the pose value correction step comprises:

detecting left and right lanes beside the vehicle, using the processor, by analyzing the image from the forward-view camera of the vehicle;

determining the location of the vanishing point in the image, using the processor, based on an intersection of the detected left and right lanes; and calculating the corrected pitch value and the corrected yaw value, using the processor, based on the location of the vanishing point in the image and the focal length value.

18. A non-transitory computer-readable storage medium having stored thereon a program that, when executed by the processor, causes the processor to execute the driving information display method of claim 11.

* * * * *